US012793864B2

(12) United States Patent
Sudant et al.

(10) Patent No.: US 12,793,864 B2
(45) Date of Patent: Nov. 10, 2026

(54) FLOATING MAINTENANCE PLATFORM FOR NUCLEAR FACILITY

(71) Applicant: FRAMATOME, Courbevoie (FR)

(72) Inventors: Romain Sudant, Beynost (FR); Arnaud Pacaut, La Boisse (FR); Jérémy Reis, Beynost (FR); Thierry Collin, Lyons (FR)

(73) Assignee: FRAMATOME, Courbevoie (FR)

( * ) Notice: Subject to any disclaimer, the term of this patent is extended or adjusted under 35 U.S.C. 154(b) by 496 days.

(21) Appl. No.: 18/039,344

(22) PCT Filed: Nov. 29, 2021

(86) PCT No.: PCT/EP2021/083357
§ 371 (c)(1),
(2) Date: May 30, 2023

(87) PCT Pub. No.: WO2022/112555
PCT Pub. Date: Jun. 2, 2022

(65) Prior Publication Data

US 2024/0021330 A1 Jan. 18, 2024

(30) Foreign Application Priority Data

Nov. 30, 2020 (FR) ................................ FR 20 12405

(51) Int. Cl.
*G21C 19/32* (2006.01)
*G21C 19/02* (2006.01)
*G21C 19/20* (2006.01)

(52) U.S. Cl.
CPC ............. *G21C 19/32* (2013.01); *G21C 19/02* (2013.01); *G21C 19/20* (2013.01); *G21C 19/207* (2013.01)

(58) Field of Classification Search
CPC ......... B63B 35/58; B63B 35/613; B63B 3/00; B63B 3/08; G21C 9/20; G21C 9/207
USPC .................................................. 114/264, 267
See application file for complete search history.

(56) References Cited

U.S. PATENT DOCUMENTS 4,409,921 A * 10/1983 Carroll ...................... B63C 5/02 441/35
5,241,572 A * 8/1993 Matthews ............... B66C 11/12 405/196
2005/0265510 A1* 12/2005 Jennings ................ G21C 19/00 376/260

(Continued)

FOREIGN PATENT DOCUMENTS

CN 206782024 U 12/2017
CN 211308907 U 8/2020
EP 0516269 A1 12/1992

(Continued)

OTHER PUBLICATIONS

International Search Report for PCT/EP2021/083357.
French Search Report for FR2012405.

*Primary Examiner* — Sharon M Davis
(74) *Attorney, Agent, or Firm* — Davidson Kappel LLC

(57) ABSTRACT

A platform comprises a floor comprising beams and removable slabs supported by the beams; and a floating support, arranged to float on the water filling a pool of the nuclear facility, a peripheral edge of the floor resting on the floating support. The floating support can annular and can internally define an opening. The floor can completely close the opening.

17 Claims, 7 Drawing Sheets

(56) References Cited

U.S. PATENT DOCUMENTS

2010/0175607 A1* 7/2010 Millet ..................... B63C 11/49
114/361

FOREIGN PATENT DOCUMENTS

| | | | |
|---|---|---|---|
| EP | 3190877 | A1 | 7/2017 |
| JP | H09222492 | A | 8/1997 |
| NO | 324640 | B1 | 11/2007 |
| WO | WO2016039632 | A1 | 3/2016 |

* cited by examiner

FLOATING MAINTENANCE PLATFORM FOR NUCLEAR FACILITY

The present disclosure relates, in general, to work platforms for carrying out maintenance operations in the pools of nuclear facilities, e.g. pools of nuclear reactors.

BACKGROUND

Such work is carried out e.g. in the pool of the reactor building, where the upper and lower internals of the reactor pressure vessel are stored during the shutdown times of the reactor. Work is intended e.g. for replacing or repairing the thermocouples equipping the vessel of the reactor, or the columns of thermocouples, or yet the upper and lower internals of the vessel of the reactor or any other equipment present in the pool.

It is possible to use, for such maintenance operations, so-called "heavy" platforms, supported by the civil engineering structures of the pool.

Such platforms require a long assembly time. The transfer thereof from one site to another requires the use of a significant number of containers, due to the number and volume of parts to be transported. Moreover, the platforms are not very modular, and might not adapt to the geometry of the pools of certain sites.

SUMMARY

In such context, the present disclosure aims to propose a maintenance platform which does not have the above defects.

To this end, the present disclosure relates to a floating platform for the maintenance of a nuclear reactor, the platform comprising:

- a floor comprising beams and removable slabs supported by the beams;
- a floating support, arranged to float on water filling a pool of the nuclear facility, a peripheral edge of the floor resting on the floating support.

The platform can further have one or a plurality of the following features, considered individually or in all technically possible combinations:

- the floating support is annular and internally delimits an opening, the floor completely closing the opening;
- the removable slabs cover more than 50% of the surface of the opening;
- the floating support comprises a plurality of floating blocks;
- the blocks are attached to each other;
- the floating support includes a ring formed by a chain of blocks attached to each other, the ring having only one block in width or two blocks in width or more than two blocks in width;
- the ring has a rectangular shape with four corners, the floating support including four inner blocks placed inside the ring, at the four corners, so that the floating support has at each corner a set of four blocks delimiting therebetween an attachment for the floor, the floor having for each set a matching attachment cooperating with the attachment of the floating support, for attaching the floor to the floating support;
- the beams are profiles;
- the platform has a system for immobilizing the platform in a horizontal plane;
- at least one of the removable slabs has a hole for letting a thermocouple column through, and a flexible tarpaulin or biological protection designed to fit around the thermocouple column.

BRIEF DESCRIPTION OF THE DRAWINGS

Other features and advantages of the present disclosure will be clear from the description thereof which is given below as an example, but not limited to, with reference to the enclosed figures, among which.

DETAILED DESCRIPTION

Figure 1:
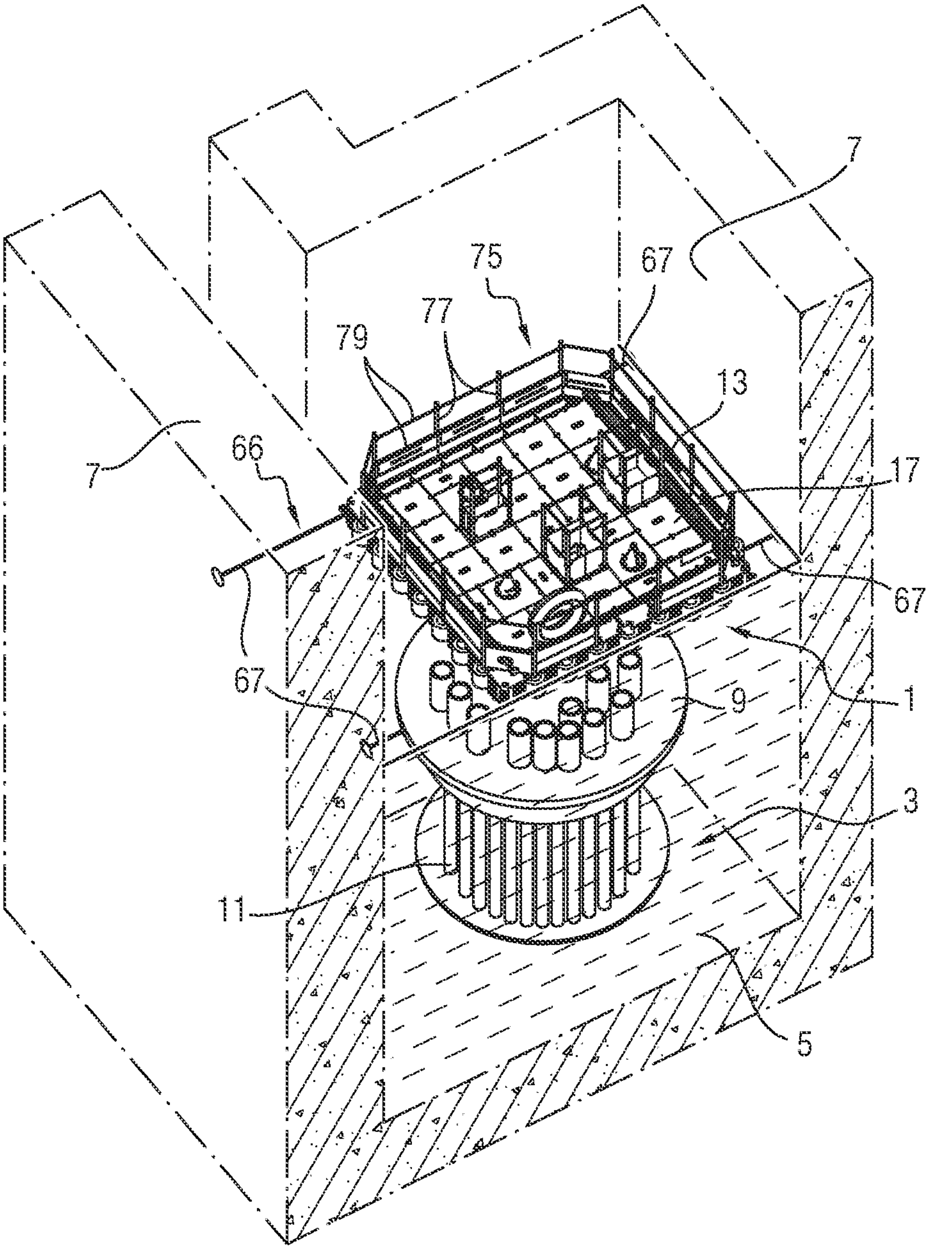
FIG. 1 is a perspective view of the pool of the reactor building of a nuclear reactor, a maintenance platform according to a first embodiment of the present disclosure, floating on the pool above the upper internals of the vessel.

The platform 1 shown in FIG. 1 is intended to be used for maintenance operations of a nuclear facility, e.g. of a nuclear reactor.

The platform 1 is a floating platform: designed for floating on water, typically on water filling a pool of the nuclear facility.

The weight of the platform is fully supported by the water in the pool.

In the example shown in FIG. 1, the platform 1 floats on the pool 3 of the reactor building. The platform is used for maintenance operations of equipment stored in the pool, such as the upper and lower internals of the pressure vessel.

The platform is used e.g. for replacing or repairing the thermocouples equipping the reactor vessel, or the thermocouple columns.

In a variant, the platform 1 floats on another nuclear facility pool, such as e.g. the deactivation pool where the nuclear fuel assemblies are stored. The platform is used for maintenance operations of equipment present in the pool, or of the pool as such.

As shown in FIG. 1, the pool 3 is delimited by a bottom 5 and walls 7, which are typically civil engineering structures covered by a steel coating.

In the example shown, the internals of the vessel 11 are placed on a stand 9, the stand resting on the bottom 5 of the pool 3.

The platform 1 is arranged on the surface of the water, above the internals of the vessel 11.

The platform 1 is designed to have at least the following functions:

- Hosting one or a plurality of operators and the necessary work equipment;
- Positioning such above the equipment intended for the maintenance work;
- Not damaging the thermocouples or the thermocouple columns, in the event of work on the internals of a vessel like the vessel shown in FIG. 1;

- Letting tools through the platform, preferentially at any point, so that work can be performed over the entire volume situated under the platform;
- Ensuring the safety of operators;
- Ensuring quick assembly;
- Having a reduced bulk for storage and transport;
- Adapting easily to the working height, i.e. to the level of water in the pool;
- Ensuring immobilization in position of the platform with respect to the pool, in the horizontal plane;
- Ensuring visibility for operators on the operations taking place under the platform.

The platform 1 includes:

- a floor 17 (FIG. 3) comprising beams 19 and removable slabs 21 supported by the beams 19;
- a floating support 13 (FIG. 2), arranged to float on the water filling the pool of the nuclear facility, a peripheral edge of the floor 17 resting on the floating support 13.

The floating support 13 is dimensioned for providing the buoyancy of the platform 1, under no-load and when a plurality of operators and the work equipment thereof are taken onboard the platform.

Advantageously, the floating support 13 is annular and internally delimits an opening 15.

The floor 17 completely closes the opening 15.

The floating support 13 comprises a plurality of floating blocks 23, attached to each other.

The floating blocks 23 are e.g. hollow structures made of plastic material, or of aluminum or yet metal.

The floating blocks 23 are advantageously parallelepipedal.

Typically, the floating blocks 23 are all identical. In a variant, certain floating blocks 23 are different from the others, in particular in the corners of the annular floating support, so as to adapt to the shape of the pool. The floating blocks have e.g., cut or cropped corners.

The blocks 23 are removably attached to each other.

Figure 4:
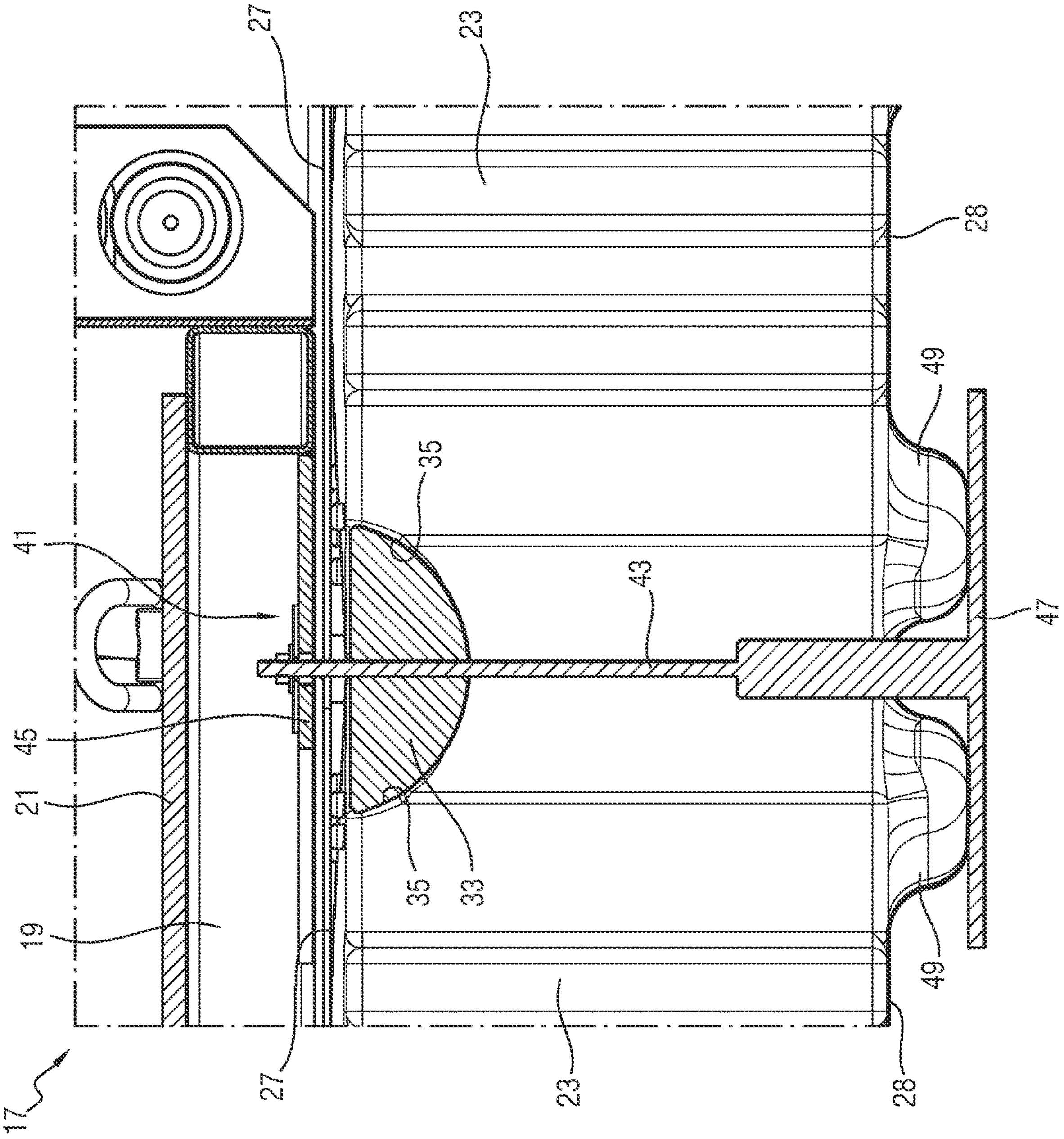
FIG. 4 is a section view of one of the connections of the floor to the floating support of the platform shown FIG. 1.

The floating blocks 23 are each delimited by four lateral faces 25, an upper face 27 and a lower face 28 (FIG. 4). The blocks 23 are juxtaposed and pressed against one another by the lateral faces 25 thereof.

The floating support 13 has a ring 29 formed by a chain of blocks 23 attached to each other. The ring 29 has only one block in width.

In a variant, the ring 29 has two blocks of width, or three blocks of width, or more than three blocks of width.

The ring 29 has a closed contour.

In a variant, the ring 29 is open at one or a plurality of points.

The ring 29 has a rectangular shape, with four corners.

In the example shown, the ring 29 is square.

The floating support 13 further includes four inner blocks 31 placed inside the ring 29, at the four corners.

Thereby, the floating support 13 has a set of four blocks 23 at each corner.

The blocks 23 of the same set are arranged in a square, each block 23 having two adjacent lateral faces 25, perpendicular to each other, pressed against the lateral faces 25 of the two other blocks 23 of the same set.

The sets of four blocks 23 are interconnected by rectilinear portions 32 of the ring 29.

The blocks 23 are attached to one another by ball joints 33.

Figure 2:
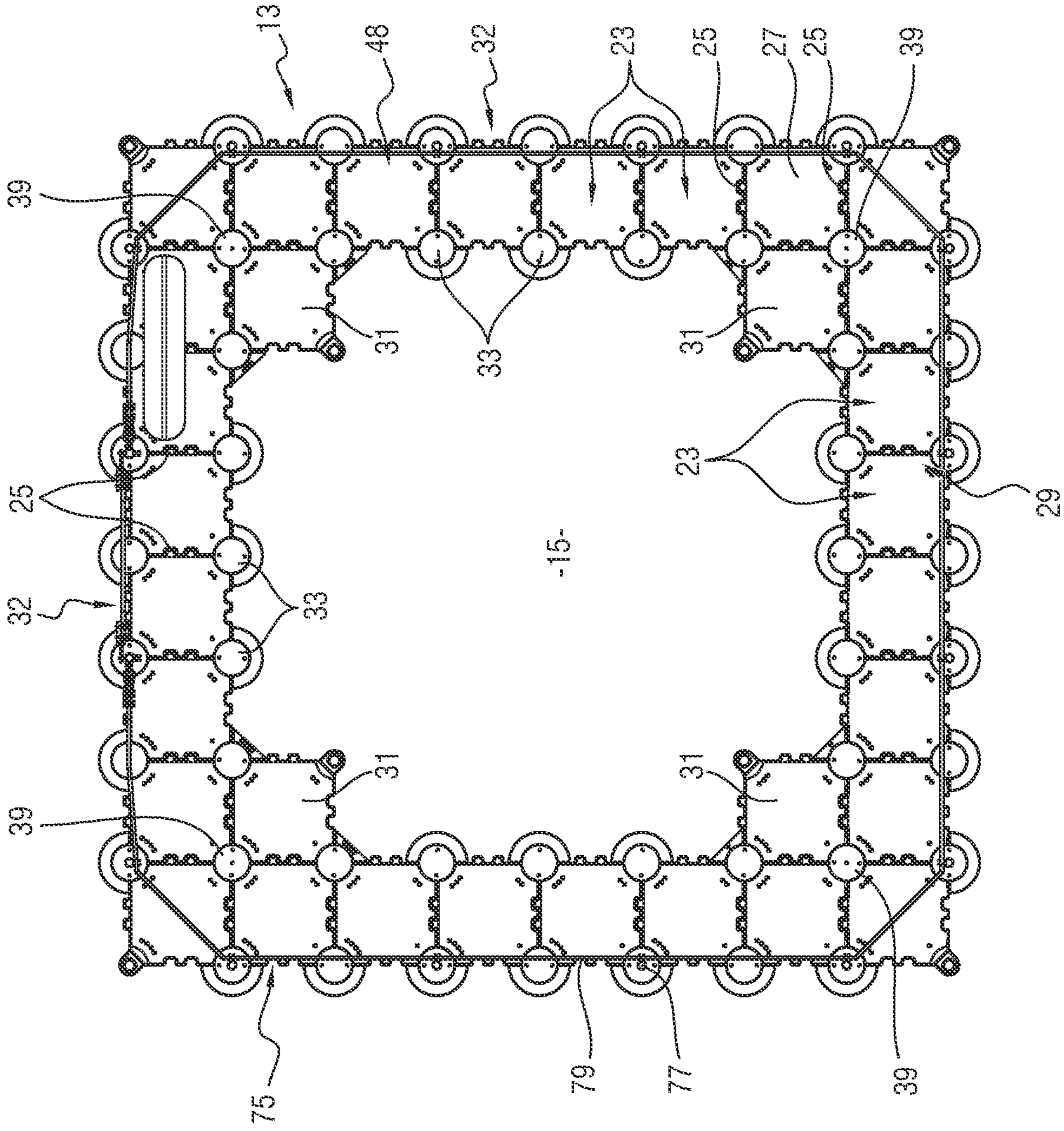
FIG. 2 is a plan view of the floating support of the platform shown in FIG. 1.

As shown in FIG. 2, two blocks 23 having respective lateral faces 25 pressed against each other are attached to each other by two ball joints 33, placed at the two ends of the lateral faces 25.

The ball joint 33 is received in a hollow cavity 35 provided on the upper faces 27 of the blocks 23.

The ball joint 33 is connected to the two blocks 23 by any suitable means.

The four blocks 23 situated at the same corner of the floating support 13 are connected to one another by a central ball joint 33. The corners of the upper faces 27 which touch each other together define the zone receiving the ball joint 33.

The ball joint 33 is used for attaching the floor 17.

Thereby, the four blocks 23 situated at the same corner of the floating support delimit therebetween an attachment 39 for the floor 17.

The floor 17 includes, for each set of four blocks 23, a matching attachment 41 cooperating with the attachment 39 for attaching the floor 17 to the floating support 13.

The matching attachment 41 includes, as illustrated in FIG. 4, a metal shaft 43 passing through the ball joint 33.

An upper end of the metal shaft 43 is rigidly attached to a metal plate 45 which is rigidly attached to the beams 19. The upper end of the metal shaft 43 is e.g. attached to the plate by means of a nut.

A bearing plate 47 is rigidly attached to the lower end of the metal shaft 43. The support plate is placed under the blocks 23 and bears against a protruding pattern in relief 49 formed on the lower faces 28 of the four blocks 23. The floor 17 bears against the upper faces 27 of the four blocks, so that the blocks 23 are pinched in-between the floor 17 and the support plate 47.

As indicated hereinabove, the peripheral edge 48 of the floor 17 rests on the floating support 13.

The peripheral edge 48 is the outer edge of the floor 17.

Typically, the floor 17 rests on the floating support 13 exclusively via the peripheral edge 48 thereof. In other words, the floating support 13 does not include any element placed under another zone of the floor and supporting the floor by means of such other zone.

The floor 17 is supported only by the floating support 13. The floor is not supported by the civil engineering structures of the pool.

The outer peripheral edge 48 of the floor 17 rests on the ring 29.

The floor 17 is rectangular in the example shown, and more precisely square. In a variant, the floor has any other suitable shape. Such shape depends on the shape of the pool and on the extent of the work area.

The beams 19 are profiles.

The profiles are either hollow or open. The profiles are typically metal profiles.

The beams 19 are e.g. made of stainless steel.

The beams 19 are rigidly attached to one another and form the framework of the floor 17.

The beams 19 are removably attached to each other.

Certain beams 19 are arranged at the level of the outer peripheral edge 48 of the floor 17 and thus form a rigid frame placed on the floating support 13. The frame has a shape corresponding to the shape of the floating support 13.

In the example shown, the frame is rectangular and has two longitudinal edges and two transverse edges.

Other beams 19 are arranged across the frame and delimit therebetween a lattice of holes, each hole being closed by one of the slabs 21.

Certain beams 19 are placed parallel to one another, along the longitudinal direction.

Other beams 19 are arranged parallel to each other, along the transverse direction.

In the example shown, the holes are of two different sizes. Most of the holes are square. A plurality of holes are rectangular and have a shape corresponding to half of one of the square holes.

The opening 15 has a size and shape chosen so as to allow operators working on the platform to access all the elements requiring maintenance.

In the example shown, the opening 15 has a cross shape and covers practically the entire surface of the vessel head.

In total, the removable slabs 21 cover more than 50% of the surface area of the opening 15, preferentially more than 80% of the surface area of the opening 15, yet preferentially more than 90% of the surface area of the opening 15.

The removable slabs 21 cover e.g. the entire surface of the opening 15, with the exception of the spaces occupied by the beams 19. In a variant, certain slabs are not removable.

Most of the slabs 21 are translucent.

The slabs 21 are e.g. made of transparent plastic, typically of polycarbonate.

The slabs are preferentially each equipped with a retractable handle, facilitating handling.

The platform 1 is equipped with a rack (not shown), making possible the storage of one or a plurality of slabs 21. Thus, when a slab 21 is removed for freeing a hole in the floor, the slab can be safely stored.

Figure 3:
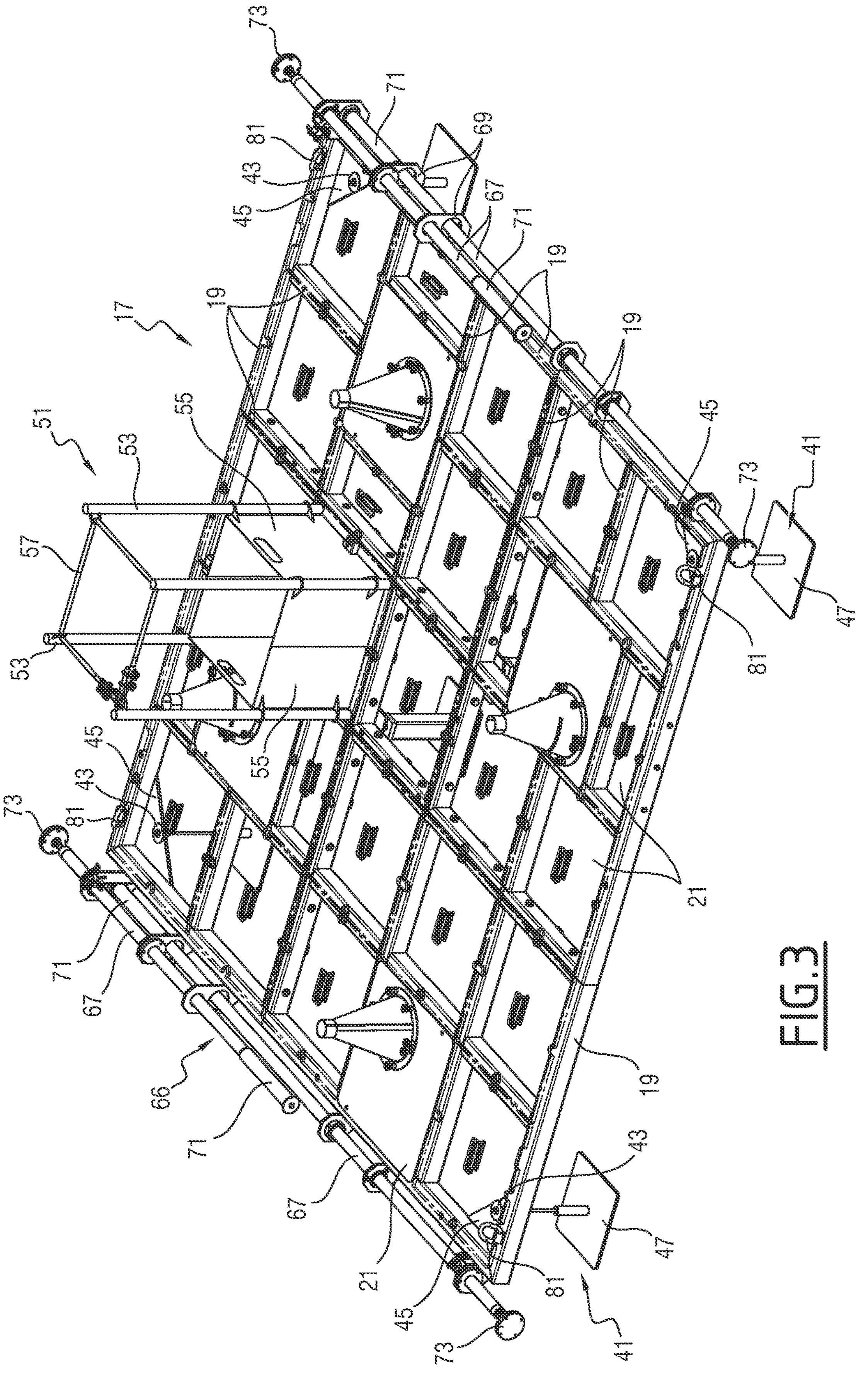
FIG. 3 is a perspective view of the floor of the platform shown in FIG. 1.

A guardrail 51 is mounted around the hole, once the slab 21 has been removed (FIG. 3). The guardrail 51 is supported by the beams 19. The guardrail comprises e.g, four vertical uprights 53, four baseboards 55 attached to the lower ends of the uprights 53, and a rail 57 connecting the upper ends of the uprights 53.

Figure 5:
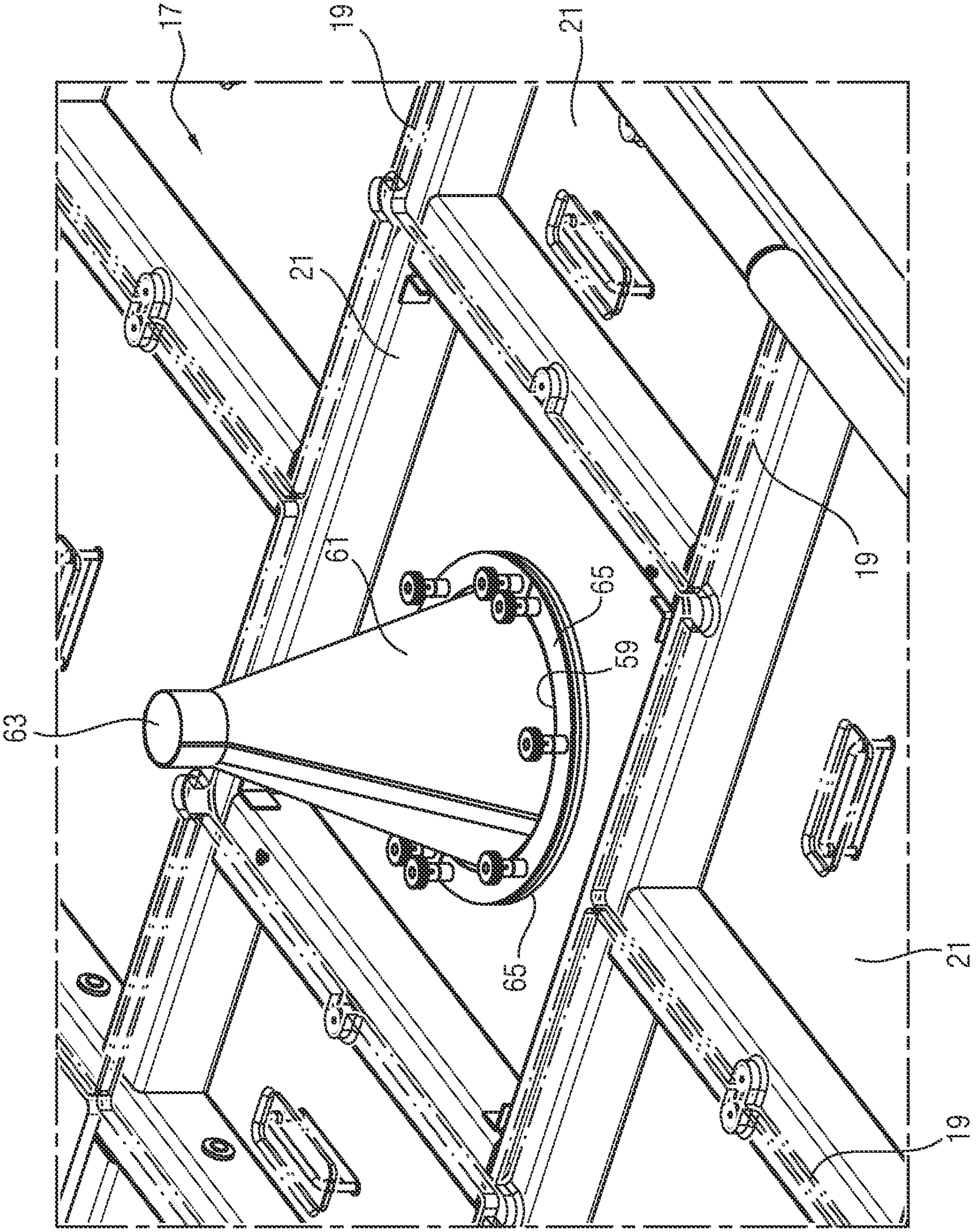
FIG. 5 is an enlarged perspective view of one of the floor slabs of the platform shown in FIG. 1.

When work is to be carried out on a thermocouple column, at least one of the removable slabs 21 includes a hole 59 for letting the thermocouple column through, and a soft tarpaulin 61 (FIG. 5).

In the present case, the removable slab 21 is made of metal.

The soft tarpaulin 61 has a hole 63, one edge of the hole 63 being designed to fit around the thermocouple column.

An outer edge of the soft tarpaulin 61 is rigidly attached to the slab 21, e.g. by half-rings 65 placed at the edges of the hole 59.

Advantageously, the platform 1 includes a system 66 for immobilizing the platform 1 with respect to the pool 3 in a horizontal plane.

The system prevents, in particular, the platform from interfering with the thermocouples and damaging the thermocouples.

In the example shown, the immobilization system 66 comprises at least four longitudinal telescopic struts 67, in two opposite pairs.

The struts 67 are mounted along two opposite edges of the floor 17. Each strut 67 slides inside rings 69 rigidly attached to the frame of the floor.

One of the rings 69 has an internal tapping.

The proximal end 71 of the strut 67 is threaded. The distal end of the strut 67 supports a bearing pad 73.

The struts 67 of the same pair are mounted on the same edge of the floor. Same can take a retracted position along the floor 17, as illustrated in FIG. 3. The struts can also take a deployed position, wherein the two struts 67 stick out longitudinally on either side of the floor 17, as illustrated in FIG. 1, in opposite directions to each other.

In the deployed position, the struts 67 of the same pair are bent in-between two walls 7 of the pool. The pad 73 of each strut 67 bears against one of the walls 7. The threaded proximal end 71 of the strut is engaged with the internal tapping of the corresponding ring 69, and is thus longitudinally locked in position.

The platform 1 further includes an outer guardrail 75 running along the outer edge of the platform 1.

The outer guardrail 75 includes a plurality of uprights 77, each rigidly attached to a ball joint 33. Two booms 79 connect the uprights 77 at two different heights.

Lifting eye bolts 81 are rigidly attached to the floor 17.

The lifting eye bolts 81 are attached to the beams 19.

The platform 1 can thus be lifted by rigging equipment, by means of slings (not shown), attached to the lifting eye bolts 81.

Figure 6:
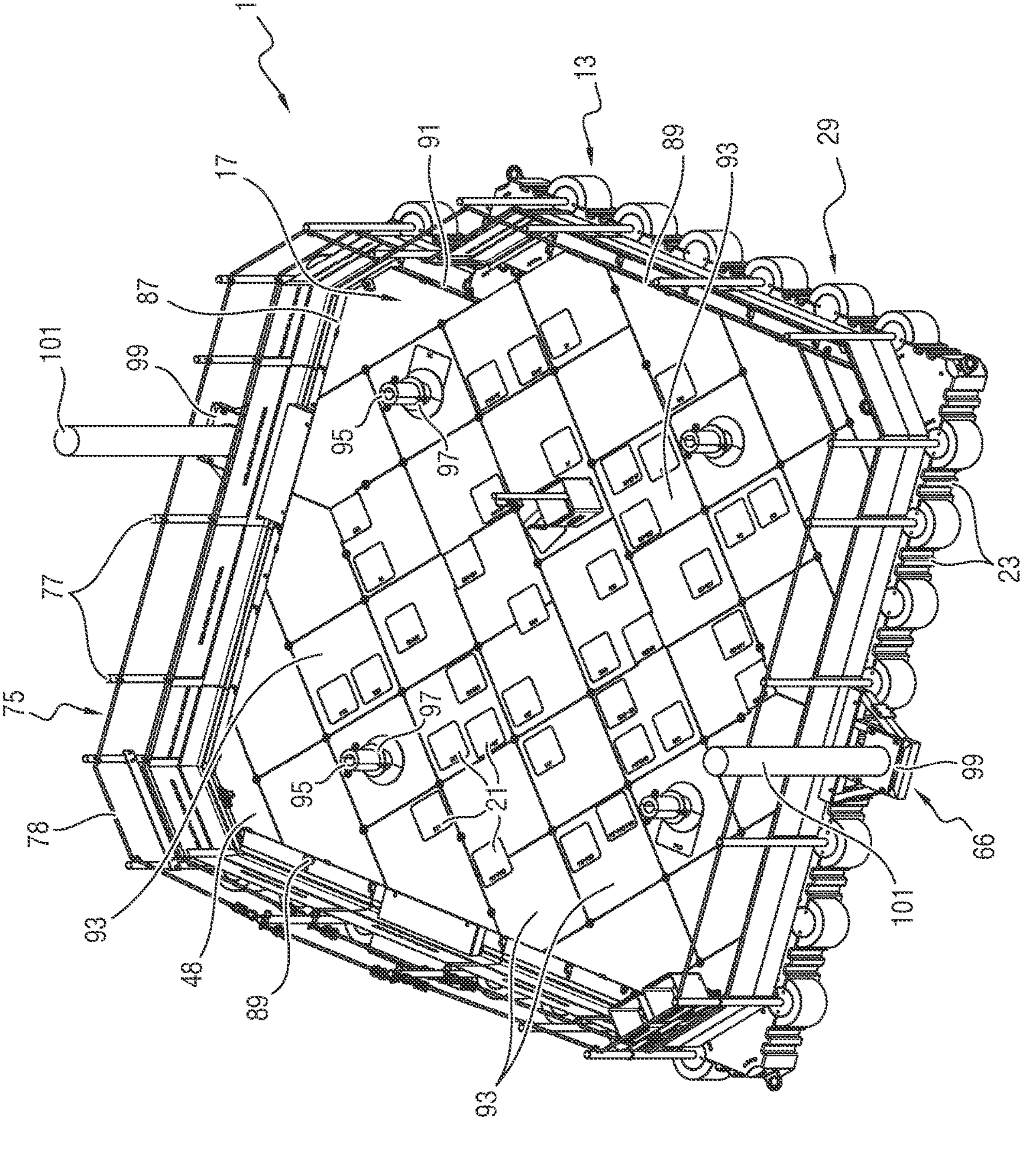
FIG. 6 is a perspective view of a maintenance platform according to an embodiment of the present disclosure.

A second embodiment of the platform will now be described with reference to FIGS. 6 and 7.

Only the aspects by which the second embodiment differs from the first will be discussed in detailed hereinbelow. Each aspect can be implemented alone, or otherwise a plurality aspects can be implemented in combination.

Elements which are identical or which have the same function as in the first embodiment will be denoted by the same references.

Figure 7:
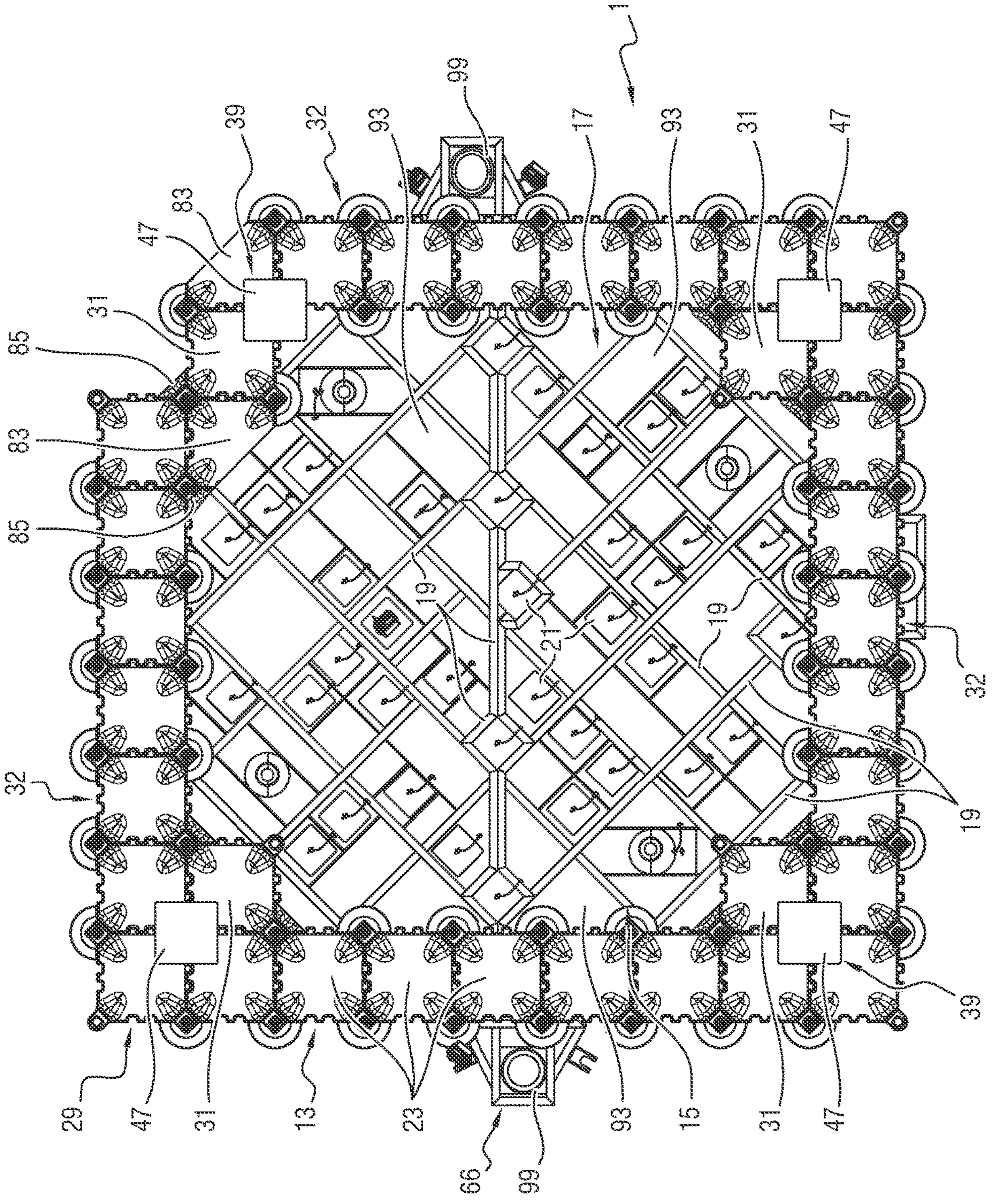
FIG. 7 is a bottom view of the maintenance platform shown in FIG. 6.

As can be seen in FIG. 7, not all the floating blocks 23 have the same shape.

The floating support 13 comprises floating blocks 83 one corner of which is cut off. In this way it is possible to adapt to the shape of the pool.

The ring 29 is not rectangular.

One of the corners of ring 29 is redesigned. The three cubic floating blocks 23, arranged in an L shape and defining the corner in the first embodiment, are removed. Same are replaced by two floating blocks 83 with a cut-off corner, one located towards the outside of the ring 29 and the other towards the inside of the ring 29.

The outer cut-off corner floating block 83 is placed in the continuation of a rectilinear portion 32 of the ring 29 connecting to the redesigned corner. Same provides the junction between the rectilinear portion and the inner block 31 of the redesigned corner. The inner cut-off corner floating block 83 is positioned towards the inside of the ring 29 with respect to the other rectilinear portion 32 connecting to the redesigned corner. Same provides the junction between the other rectilinear portion and the inner block 31 of the redesigned corner.

The attachment 39 is placed at the junction point between the outer cut-off corner floating block 83, the inner block 31 and the end floating block 23 of the rectilinear portion 32.

Metal reinforcing pieces 85, in the form of a bracket, are placed between the inner block 31 and the floating block 23 at the end of the rectilinear portion 32, between the inner block 31 and the floating block 23 at the end of the other rectilinear portion 32, and between the inner cut-off corner floating block 83 and the second last floating block 23 of the other rectilinear portion 32. The metal parts 85 reinforce the connections between the blocks.

The floor 17 is not rectangular. The floor has a shape which follows the shape of the floating support 13.

The frame of the floor includes two longitudinal edges 87 and two transverse edges 89. Same also has a zig-zag edge 91 connecting one of the longitudinal edges to one of the transverse edges.

The zig-zag edge 91 rests on the redesigned corner of the ring 29.

First beams 19 are placed parallel to one another, along a direction inclined with respect to the longitudinal edges 87 and to the transverse edges 89.

Such direction is e.g. inclined at 45° with respect to the longitudinal edges 87 and to the transverse edges 89.

Second beams 19 are arranged parallel to one another, along another direction inclined with respect to the longitudinal edges 87 and to the transverse edges 89.

Such direction is e.g. inclined at 45° with respect to the longitudinal edges 87 and to the transverse edges 89, and at 90° with respect to the first beams 19.

As can be seen in FIG. 7, additional beams 19 are oriented along other directions than the first and second beams 19.

The floor 17 includes a large number of non-removable slabs 93 supported by the beams 19.

The non-removable slabs 93 cover the entire surface of the floor 17.

The non-removable slabs 93 are made of a transparent plastic material, typically of polycarbonate.

The holes for letting the tools through are cut out in the non-removable slabs 93. The holes are each covered by a removable slab 21.

The removable slabs 21 are thus supported indirectly by the beams 19 via the non-removable slabs.

The removable slabs 21 together cover between 10 and 50% of the surface area of the opening 15.

Same are distributed over the greater part of the surface of the floor 17.

The removable slabs 21 are preferentially made of metal, e.g. of stainless steel.

In the example shown, the removable slabs 21 all have the same shape. E.g. same are square.

In the second embodiment, the soft tarpaulin 61 is replaced by a biological protection 95.

The biological protection 95 is cylindrical and is designed for fitting around the thermocouple column or thermocouple bundle.

The biological protection comprises two half-cylinders independent of each other. A collar 97 placed around the biological protection 95 holds the two half-cylinders clamped against each other.

The biological protection ensures the absorption of some of the ionizing radiation and further prevents, like the soft tarpaulin, objects from falling into the holes.

The system 66 for immobilizing the platform 1 with respect to the pool 3 in the horizontal plane comprises two guiding rings 99 rigidly attached to the floor 17.

The rings are designed for sliding along two fixed vertical columns 101 mounted in the pool.

The columns 101 are e.g. column extensions. Same are installed by means of a handling means on the guiding columns which are already present. In the case of a support stand for the upper internals of the type shown in the figures, the columns 101 are permanently on the stand.

The platform can have multiple variants.

The platform 1 has been described as being substantially square. In a variant, the platform is rectangular or has any other shape suitable for the pool where the +work takes place.

The opening 15, in the example described hereinabove, has the shape of a cross. In a variant, the opening is square, rectangular or has any other suitable shape.

The blocks 23 are not necessarily parallelepipedal. In a variant, the blocks have another section, e.g. triangular, hexagonal, or any other section making it possible to overlay the blocks and obtain the desired shape for the floating support.

The floating support is not necessarily annular. E.g., same includes floating islands, separated from each other. The floating islands are rigidly attached to one another by non-floating structures, e.g. metal joists. Each island typically includes a plurality of floating blocks. The floating islands are distributed along the peripheral edge of the floor, so as to provide good stability and sufficient buoyancy for the platform.

The removable slabs are supported directly by the floor beams, or indirectly. In the latter case, same can be supported via non-removable slabs or via any other structure.

The maintenance platform has multiple advantages.

The platform is floating, so that same naturally follows the level of water in the pool where the work takes place.

Because the platform is floating, it is not necessary to provide heavy and bulky attachments to the civil engineering structures surrounding the pool. The space requirement of the platform is thus reduced, so that storage and transportability of the platform are facilitated.

The platform is lightweight due to the structure thereof, which contributes to facilitating the assembly and the transportability thereof.

A floating support which can have any suitable shape imparts buoyancy to the platform. Because the floor rests on the floating support at the peripheral edge thereof, a large support area of the floor can be used in the center for accessing the work zone under the platform.

The removable slabs can free up holes at virtually any point on the floor, and let tools pass through the holes.

The structure of the floor, with beams and removable slabs, is such that the points of support of the floor on the floating support can be widely separated from each other, so that the floor surface area which can be used for accessing the work zone under the platform, can be large.

An annular floating support is particularly well suited for supporting the floor. Same can support the latter over a large part of the periphery thereof, or even throughout the periphery. Same can have any suitable shape, depending on the shape of the pool. Thereby, the opening delimited by the floating support can have a size and a shape chosen to cover the entire working zone under the platform, e.g. all the internals of the vessel in the embodiment shown in the figures.

The fact that the floating support comprises a plurality of floating blocks makes the support highly scalable.

The fact that the floating blocks are attached to each other contributes to the fact that the platform is easy to assemble and disassemble. The above also facilitates the storage and the transport of the platform, since the blocks are small and can be separated from each other.

The fact that the floating support includes a ring formed from a chain of blocks attached to each other, the ring having a single block in width, makes it possible to easily delimit the opening, with a reduced number of blocks. The floating support thus has the smallest possible weight and bulk. The opening is as large as possible.

The ring, in a variant, has two blocks in width, or even three or more. Such can be the case e.g. in a fuel assembly storage pool, for a work on a limited number of assemblies.

The four inner blocks, placed at the four inner corners of the ring, make it possible to easily attach the floor to the floating support. Same are used for forming sets of four blocks, delimiting at the centers thereof, the points of attachment of the floor.

Because the beams are profiles, the structure of the floor is both rigid and light.

Since the removable slabs cover more than 50% of the surface area of the opening, it is possible to access practically the entire volume under the opening, for maintenance operations.

The four longitudinal telescopic struts, in opposite pairs, are used for blocking the platform in a horizontal plane with respect to the pool. The blocking is achieved in a simple and inexpensive way, using elements with a reduced weight.

The fact that the floor includes at least one of the removable slabs with a hole for letting through a thermocouple column and a soft tarpaulin with a hole, makes possible to easily work on the thermocouple column. The latter is engaged through the through hole and is thus easily accessible to operators working on the platform. The soft tarpaulin fits around the column, preventing debris from falling into the pool through the gap between the edge of the through hole and the thermocouple column.

The fact that most of the slabs are translucent allows operators to see through the floor and follow the progress of maintenance operations.

What is claimed is:

1. A floating platform for maintenance of a nuclear facility, the platform comprising:

a floor comprising beams and removable slabs supported by the beams; and a floating support arranged to float on a water filling a pool of the nuclear facility, a peripheral edge of the floor resting on the floating support;

wherein the floating support comprises a plurality of floating blocks;

wherein the blocks are attached to each other;

wherein the floating support includes a ring formed of a chain of blocks attached to each other, the ring having only one block in width or two blocks in width or more than two blocks in width;

wherein the ring has a rectangular shape with four corners, the floating support including four inner blocks placed inside the ring at the four corners, so that the floating support has at each corner a set of four blocks delimiting there between an attachment for the floor, the floor having for each set a matching attachment cooperating with the attachment of the floating support, for attaching the floor to the floating support.

2. The floating platform according to claim 1, wherein the beams are metal sections.

3. The floating platform according to claim 1, further comprising a system for immobilizing the platform in a horizontal plane.

4. The floating platform according to claim 1, wherein at least one of the removable slabs has a hole for letting a thermocouple column through, and a soft tarpaulin or a biological protection designed for fitting around the thermocouple column.

5. The floating platform as recited in claim 1, wherein the floor includes non-removable slabs supported by the beams, holes for letting tools through being cut out in the non-removable slabs, each hole being covered by one of the removable slabs.

6. The floating platform according to claim 5, wherein the non-removable slabs extend over the entire surface of the floor.

7. The floating platform according to claim 5, wherein the non-removable slabs are made of a transparent plastic material.

8. The floating platform according to claim 5, wherein the floating support is annular and internally delimits an opening, the removable slabs together covering between 10 and 50% of the surface area of the opening.

9. The floating platform according to claim 1, wherein the floating support is annular and internally defines an opening, the floor completely closing the opening.

10. The floating platform according to claim 9, wherein the removable slabs cover more than 50% of a surface area of the opening.

11. A floating platform for maintenance of a nuclear facility, the platform comprising:

a floor comprising beams and removable slabs supported by the beams; and a floating support arranged to float on a water filling a pool of the nuclear facility, a peripheral edge of the floor resting on the floating support;

wherein at least one of the removable slabs has a hole for letting a thermocouple column through, and a soft tarpaulin or a biological protection designed for fitting around the thermocouple column.

12. The floating platform according to claim 11, wherein the floating support comprises a plurality of floating blocks.

13. The floating platform according to claim 12, wherein the blocks are attached to each other.

14. The floating platform according to claim 13, wherein the floating support includes a ring formed of a chain of blocks attached to each other, the ring having only one block in width or two blocks in width or more than two blocks in width.

15. The floating platform according to claim 14, wherein the ring has a rectangular shape with four corners, the floating support including four inner blocks placed inside the ring at the four corners, so that the floating support has at each corner a set of four blocks delimiting there between an attachment for the floor, the floor having for each set a matching attachment cooperating with the attachment of the floating support, for attaching the floor to the floating support.

16. A floating platform for maintenance of a nuclear facility, the platform comprising:

a floor comprising beams and removable slabs supported by the beams; and a floating support arranged to float on a water filling a pool of the nuclear facility, a peripheral edge of the floor resting on the floating support;

the floating platform further comprising a system for immobilizing the platform in a horizontal plane, the immobilization system comprising a plurality of horizontal longitudinal telescopic struts, each strut being arranged to bear against a wall of the nuclear facility, wherein the plurality of longitudinal telescopic struts comprises at least four longitudinal telescopic struts including a first pair of longitudinal telescopic struts on a first edge of the floor and a second pair of longitudinal telescopic struts on a second edge of the floor, the first edge of the floor being on an opposite side of the floor as the second edge of the floor, the struts of the first pair being able to take a retracted position along the floor and a deployed position, in which the two struts of the first pair stick out longitudinally in opposite directions to each other, the struts of the second pair being able to take a retracted position along the floor and a deployed position, in which the two struts of the second pair stick out longitudinally in opposite directions to each other.

17. The floating platform as recited in claim 16 wherein the floor includes non-removable slabs supported by the beams, holes for letting tools through being cut out in the non-removable slabs, each hole being covered by one of the removable slabs.

* * * * *